(12) United States Patent
Jeon

(10) Patent No.: US 12,147,102 B2
(45) Date of Patent: Nov. 19, 2024

(54) DISPLAY APPARATUS WITH DECORATIVE LIGHTING UNIT

(71) Applicant: KORTEK CORPORATION, Incheon (KR)

(72) Inventor: Hong Jin Jeon, Goyang-si (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 18/410,282

(22) Filed: Jan. 11, 2024

(65) Prior Publication Data

US 2024/0248337 A1 Jul. 25, 2024

(30) Foreign Application Priority Data

Jan. 19, 2023 (KR) .................. 10-2023-0007970

(51) Int. Cl.
  *G02F 1/1333* (2006.01)
  *G02F 1/13357* (2006.01)
  *G09F 9/30* (2006.01)

(52) U.S. Cl.
  CPC .. *G02F 1/133314* (2021.01); *G02F 1/133603* (2013.01); *G09F 9/30* (2013.01)

(58) Field of Classification Search
  None
  See application file for complete search history.

(56) References Cited

U.S. PATENT DOCUMENTS

2009/0167192 A1\* 7/2009 Diederiks ............... H04N 9/73
  315/149
2010/0238664 A1\* 9/2010 Steenbergen ..... G02F 1/133308
  362/276

FOREIGN PATENT DOCUMENTS

KR  10-2242471 B1  8/2016
WO  WO-2015119332 A1 \*  8/2015 ............ A47G 1/06

\* cited by examiner

*Primary Examiner* — Richard H Kim
(74) *Attorney, Agent, or Firm* — Schmeiser, Olsen & Watts LLP

(57) ABSTRACT

A disclosed display apparatus is provided including: a rear case having an inner space; an image display unit installed in the inner space of the rear case, and in which an image is displayed on a front surface; and a decorative lighting unit including a light diffuser installed around the image display unit in the inner space of the rear case, and formed with a grid pattern, and a decorative light source arranged behind the light diffuser to transmit light through the light diffuser.

7 Claims, 4 Drawing Sheets

DISPLAY APPARATUS WITH DECORATIVE LIGHTING UNIT

CROSS-REFERENCE TO RELATED APPLICATION

This application claims the benefit of priority under 35 USC § 119(a) to Korean Patent Application No. 10-2023-0007970, filed on Jan. 19, 2023, the entire disclosure of which is incorporated herein by reference.

FIELD OF TECHNOLOGY

The following relates to a display apparatus, and more specifically, to a display apparatus including a decorative lighting unit around an image display unit on which an image is displayed.

BACKGROUND

A display apparatus is, for example, a device, such as a monitor, which receives image signals and displays an image on a front surface. Images include still images and moving images. Display apparatuses are used in a variety of fields and are frequently used for gaming purposes in PC rooms, game rooms, and homes.

When the main purpose of the display apparatus is for gaming purposes, separate decorative lighting can be installed around the display apparatus. Decorative lighting can have effects such as inducing focus on the game, arousing attention of the game viewers, and heightening the atmosphere. However, when the display apparatus and decorative lighting are separately purchased and installed, not only purchase and installation costs increase and the display apparatus and decorative lighting occupy a lot of installation space, but also an interval between the display apparatus and the decorative lighting increases, thereby a sense of heterogeneity is felt and aesthetics is lowered.

The conventional art is disclosed in Korean Registration Patent No. 10-2242471 (registered on Apr. 14, 2021, Invention title: Event lighting apparatus in monitor for game console).

SUMMARY

An aspect relates to a display apparatus including a decorative lighting unit around an image display unit.

According to an aspect of embodiments of the present invention, there is provided a display apparatus including: a rear case having an inner space; an image display unit installed in the inner space of the rear case, and in which an image is displayed on a front surface; and a decorative lighting unit including a light diffuser installed around the image display unit in the inner space of the rear case, and formed with a grid pattern, and a decorative light source arranged behind the light diffuser to transmit light through the light diffuser.

The display apparatus of embodiments of the present invention may further include an inner case installed in the inner space of the rear case, and configured to support the image display unit so that the image display unit is located at a central portion of the rear case.

The light diffuser may include an opaque-colored partition wall having a grid-type planar shape to define a plurality of cells arranged in a matrix, and a plurality of light diffusion blocks formed of a light diffusion material and fitted one by one into the plurality of cells.

Light incident on a rear surface of one light diffusion block among the plurality of light diffusion blocks may be blocked by the partition wall in surface contact with a side surface of the one light diffusion block, and thus may be diffused only in the one light diffusion block and emitted to a front surface of the one light diffusion block.

The decorative light source may include a plurality of light-emitting diode packages arranged behind the plurality of light diffusion blocks in a one-to-one alignment and an LED board on which the plurality of LED packages is mounted.

The display apparatus of embodiments of the present invention may further include a heat resistant double-sided adhesive tape having one side surface adhered to the LED board and the other side surface adhered to a bottom surface of the rear case to fix the LED board to the rear case.

The image display unit may include an LCD panel including a pair of substrates spaced apart from each other, and a liquid crystal layer interposed between the pair of substrates, and a backlight unit (BLU) configured to project white light onto the LCD panel from behind the LCD panel.

The decorative light source may blink in synchronization with the image displayed on a front surface of the image display unit.

BRIEF DESCRIPTION

Some of the embodiments will be described in detail, with reference to the following figures, wherein like designations denote like members, wherein.

DETAILED DESCRIPTION

Hereinafter, a display apparatus including a decorative lighting unit according to an embodiment of the present invention will be described in detail with reference to the attached drawings. The terminologies used in this specification are terms used to appropriately express exemplary embodiments of the present invention and may vary depending on the intention of a user or operator or the custom of the field to which embodiments of the present invention belongs. Therefore, definitions of the terms should be made based on the content throughout this specification.

Figure 1:
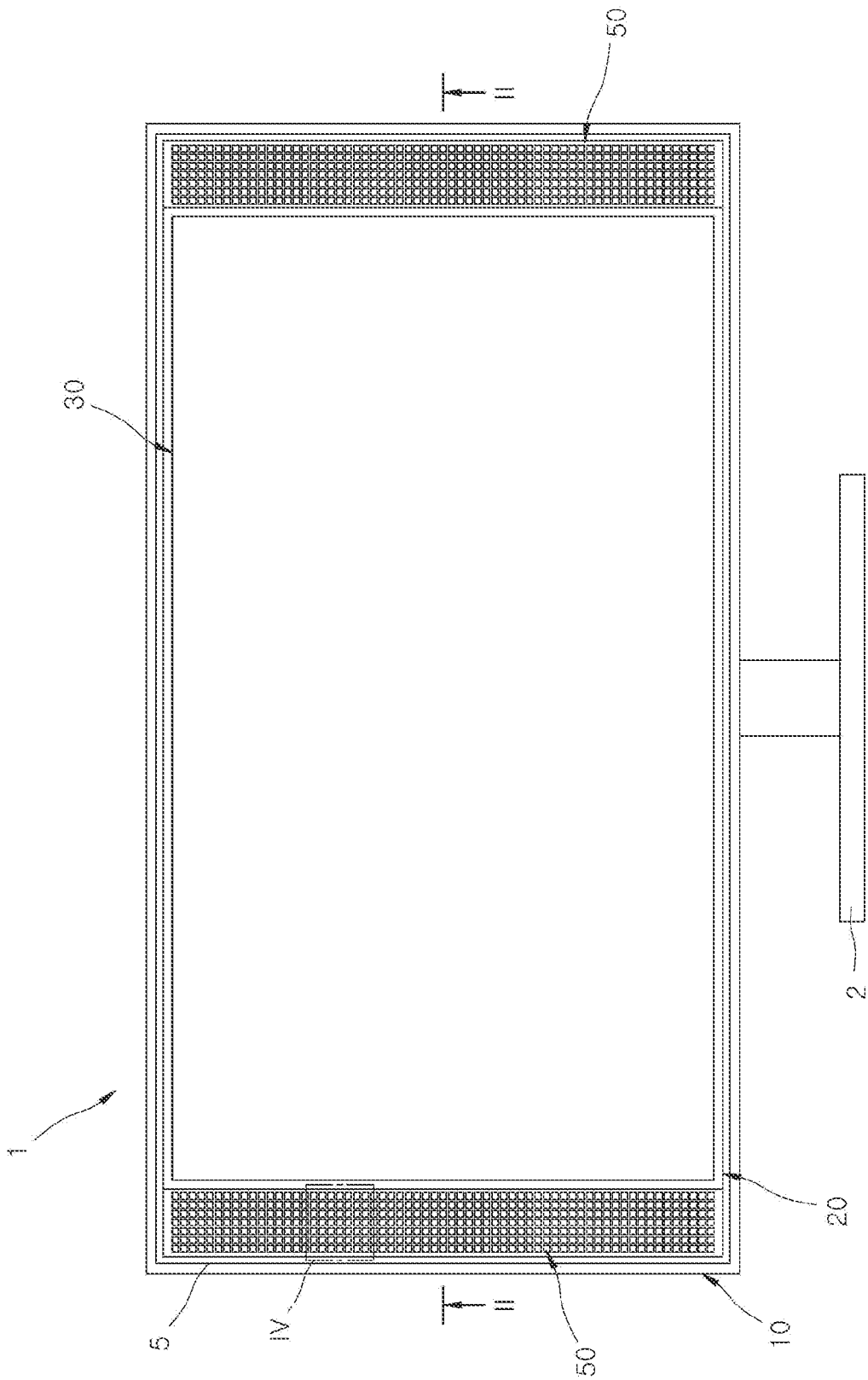
FIG. 1 is a front view of a display apparatus according to one embodiment of the present invention.
Figure 2:
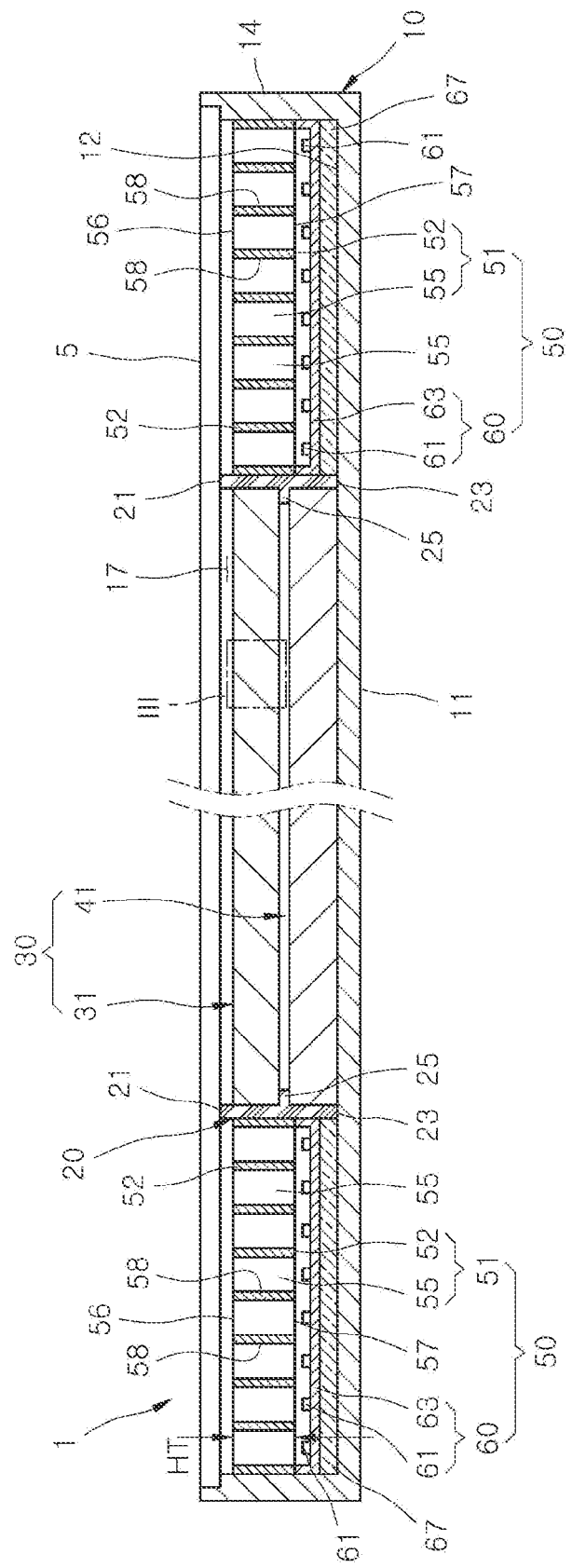
FIG. 2 is a cross-sectional view taken along line II-II in FIG. 1.
Figure 3:
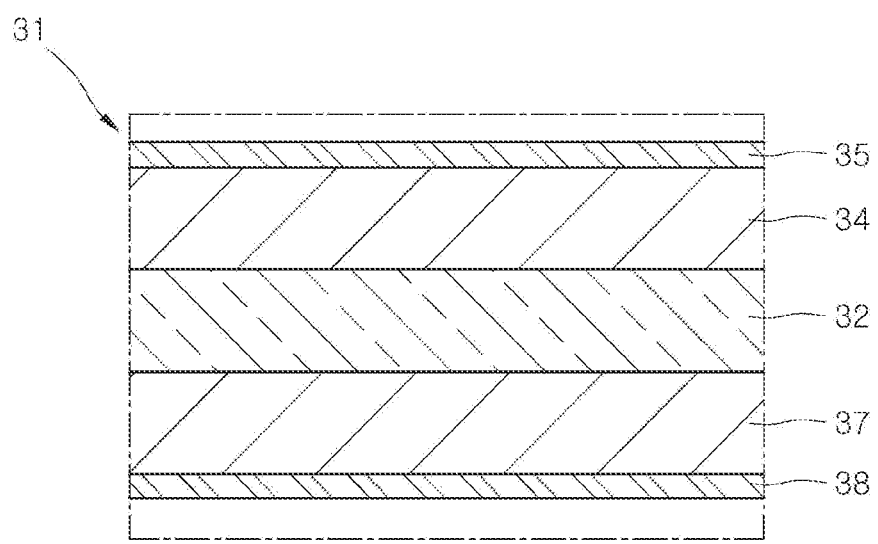
FIG. 3 is an enlarged view of portion III in FIG. 2.
Figure 4:
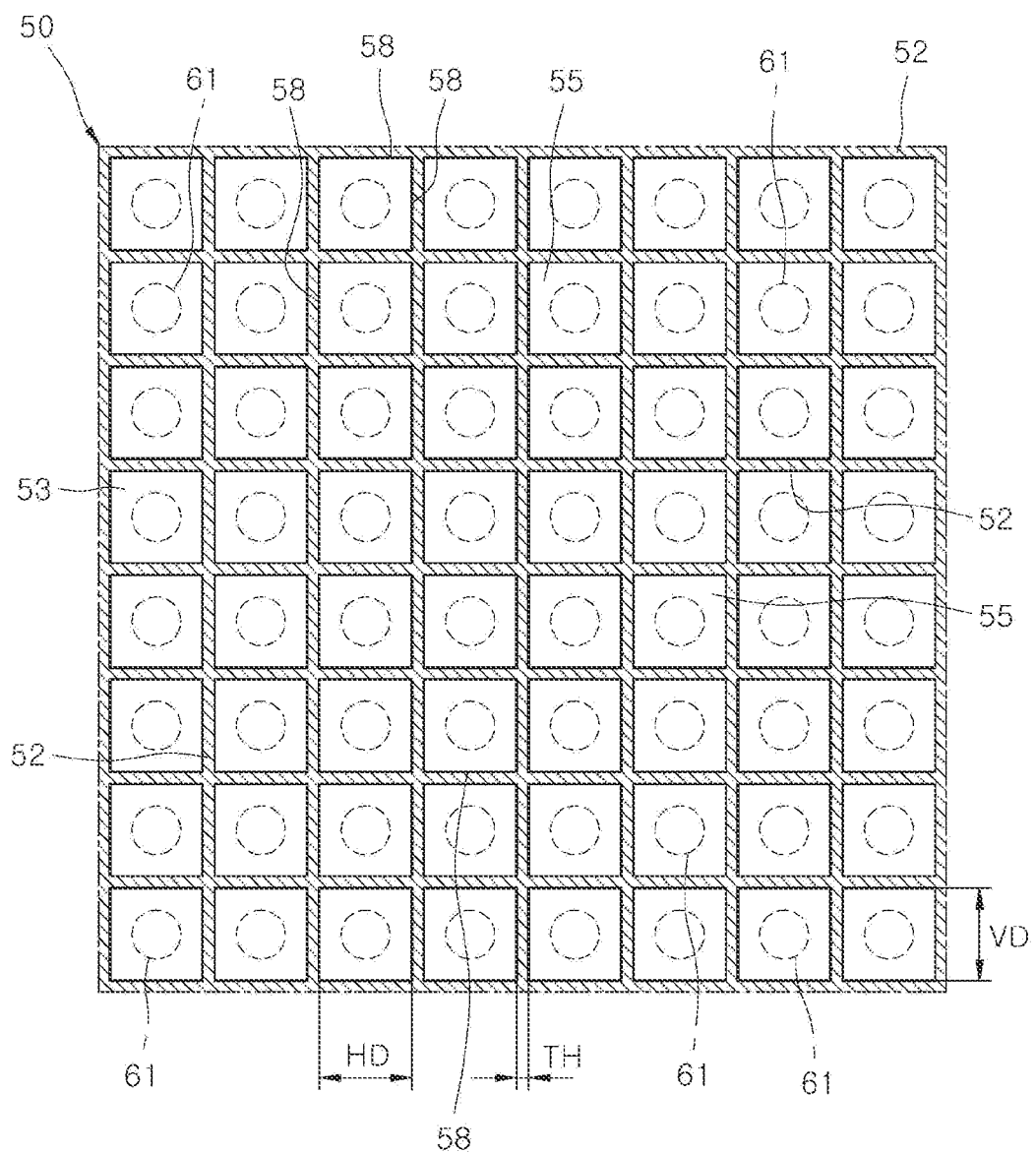
FIG. 4 is an enlarged view of portion IV in FIG. 1.

FIG. 1 is a front view of a display apparatus according to one embodiment of the present invention, FIG. 2 is a cross-sectional view taken along line II-II in FIG. 1, FIG. 3 is an enlarged view of portion III in FIG. 2, and FIG. 4 is an enlarged view of portion IV in FIG. 1. Referring to FIGS. 1 to 4 together, a display apparatus 1 according to the embodiment of the present invention is a gaming monitor suitable for playing games, and includes a rear case 10, a support leg 2, a front protection panel 5, an image display unit 30, an inner case 20, a plurality of decorative lighting units 50, and a controller (not shown).

The rear case 10 is a member in which an inner space 17 is formed and a front surface is open. The rear case 10 includes a bottom portion 11 with an approximately quadrangular shape and an edge portion 14 protruding forward from an outer circumferential corner of the bottom portion 11 to form the inner space 17 of the rear case 10. The support leg 2 is fixed and coupled to the rear case 10 so that the rear case 10 stands upright on a flat surface.

The image display unit 30, the inner case 20, and the plurality of decorative lighting units 50 are installed in the inner space 17 of the rear case 10. The front protection panel 5 closes the front surface of the rear case 10 to protect the image display unit 30 and the plurality of decorative lighting units 50 accommodated in the inner space 17 of the rear case 10. The front protection panel 5 may be a transparent tempered glass plate. An outer circumferential corner portion of the front protection panel 5 may be seated on and fixed to a front end portion of the edge portion 14.

The image display unit 30 displays an image on the front surface and is installed in the inner space 17 of the rear case 10. The image display unit 30 includes a liquid crystal display (LCD) panel 31 and a backlight unit (BLU) 41 which projects white light onto the LCD panel 31 from behind the LCD panel 31. The LCD panel 31 includes a front substrate 34 and a rear substrate 37, which are parallel to each other and are transparent, a liquid crystal layer 32, a front polarization film 35, and a rear polarization film 38. The liquid crystal layer 32 is interposed between the front substrate 34 and the rear substrate 37. Transparent electrodes (not shown) are formed on a rear surface of the front substrate 34 and a front surface of the rear substrate 37, which face each other with the liquid crystal layer 32 therebetween, so that electrical signals are applied in units of pixels. When an electrical signal is applied to a specific pixel through the transparent electrode, the twisted liquid crystal is untangled, or conversely, the liquid crystal is twisted according to a liquid crystal type.

The front polarization film 35 is attached to a front surface of the front substrate 34, and the rear polarization film 38 is attached to a rear surface of the rear substrate 37. The front substrate 34 to which the front polarization film 35 is attached is also referred to as a front polarization panel, and the rear substrate 37 to which the rear polarization film 38 is attached is also referred to as a rear polarization panel.

The backlight unit 41 may include a light guide plate (not shown) having a planar shape corresponding to a planar shape of the LCD panel 31, and a backlight light source (not shown), which emits white light to a side surface of the light guide plate. Alternatively, the backlight unit 41 may include a light diffusion plate (not shown) having a planar shape corresponding to the planar shape of the LCD panel 31, and a backlight light source (not shown), which projects light onto a rear surface of the light diffusion plate from behind the light diffusion plate. The backlight light source (not shown) may include a plurality of (light emitting diode) LED packages. Meanwhile, the image display unit 30 provided in embodiments of the present invention is not limited to including the LCD panel 31 and the backlight unit 41, and may include, for example, a self-light-emitting display panel such as an active-matrix organic light-emitting diode (AMOLED) panel.

The inner case 20 is a member having a quadrangular window frame shape and is installed in the inner space 17 of the rear case 10 and supports the image display unit 30 so that the image display unit 30 is located at a central portion of the inner space 17 of the rear case 10. The inner case 20 includes a spacer 25 protruding inward so that the LCD panel 31 and the backlight unit 41 are spaced apart from each other. A rear end portion 23 of the inner case 20 may be fixed to and supported on a bottom surface 12 of the rear case 10. A front end portion 21 of the inner case 20 may come into contact with and support the front protection panel 5.

The plurality of decorative lighting units 50 are installed around the image display unit 30 in the inner space 17 of the rear case 10. In the embodiment shown in FIG. 2, among the plurality of decorative lighting units 50, a pair of decorative lighting units 50 are provided at each of left and right sides of the image display unit 30 and may also be provided at an upper side or a lower side of the image display unit 30 in addition to the left and right sides.

Each decorative lighting unit 50 includes a light diffuser 51 formed with a grid pattern, and a decorative light source 60 arranged behind the light diffuser 51 to transmit light through the light diffuser 51. The light diffuser 51 includes a partition wall 52 and a plurality of light diffusion blocks 55. The partition wall 52 is a member, for example, formed of a plastic material having an opaque color such as black, and having a grid-type planar shape to define a plurality of cells arranged to form a matrix in a single layer. The plurality of light diffusion blocks 55 are fitted one by one into the plurality of cells defined by the partition wall 52, and for example, are formed of a light diffusion material such as an acrylic resin or a polycarbonate resin. The plurality of light diffusion blocks 55 have the same rectangular parallelepiped shape.

Each light diffusion block 55 includes a rear surface 57 on which light is incident, a front surface 56 through which the light incident from the rear surface 57 is diffused and emitted, and four side surfaces 58 are in surface contact with the partition wall 52 and blocked by the partition wall 52. A horizontal size HD and a vertical size VD of the light diffusion block 55 may be the same. The magnitude of a height HT of the light diffusion block 55 may be 0.7 to 1.1 times the horizontal size HD and the vertical size VD. When the height HT of the light diffusion block 55 is smaller than 0.7 times the horizontal size HD and the vertical size VD, it is difficult to remove a hot spot phenomenon where only a central portion of the light diffusion block 55 overlapping the LED package 61 to be aligned shines strongly and the surrounding areas are dark. Further, when the magnitude of the height HT of the light diffusion block 55 is greater than 1.1 times the horizontal size HD and the vertical size VD, since the light diffuser 51 becomes too thick, the display apparatus 1 becomes thicker, and production costs of the light diffuser 51 increase. Here, a direction of the height HT of the light diffusion block 55 is parallel to a direction from the front to the rear of the image display unit 30.

When a thickness TH of the partition wall 52 is smaller than 0.5 mm, since the rigidity of the partition wall 52 is weakened and thus the light diffusion block 55 may not be stably attached and supported, the magnitude of the thickness TH of the partition wall 52 may be 0.5 mm or more. A height of the partition wall 52 is the same as the height HT of the light diffusion block 55.

The decorative light source 60 includes a plurality of (light emitting diode) LED packages 61 arranged behind the plurality of light diffusion blocks 55 in a one-to-one alignment so that light is projected onto front surfaces 56 of the plurality of light diffusion blocks 55 and an LED board 63 on which the plurality of LED packages 61 are mounted. Each LED package 61 is a package of a plurality of LEDs which emits light of different colors, and one LED R which emits red (R) light, one LED G which emits green (G) light, and one LED B which emits blue (B) light are packaged as one and configured to emit all natural colors.

The plurality of LED packages 61 are mounted on the LED board 63 so that electrical connection is possible. The LED board 63 may be fixed to the bottom surface 12 of the rear case 10 by a double-sided tape 67. Specifically, a front surface of the double-sided tape 67 may adhere to the LED board 63, and a rear surface of the double-sided tape 67 may adhere to the bottom surface 12 of the rear case 10. The double-sided tape 67 may be a heat resistant double-sided adhesive tape so that the adhesive strength of the double-sided tape 67 is not weakened even when the plurality of LED packages 61 emit light and thus a temperature of the LED board 63 rises.

Light projected from any one LED package 61 among the plurality of LED packages 61 is incident only on the rear surface 57 of one specific light diffusion block 55 corresponding to the LED package 61 from which the light is projected among the plurality of light diffusion blocks 55. Further, the light incident on the rear surface 57 of one light diffusion block 55 is blocked by the partition wall 52, which is in surface contact with the side surface 58 of the one light diffusion block 55, and thus is diffused only in the one light diffusion block 55 and emitted to the front surface 56 of the one light diffusion block 55.

In this case, as described above, since the light diffusion block 55 has a sufficient height HT, a hot spot phenomenon in which only the central portion of the light diffusion block 55 excessively brightly shines does not occur. Further, since the light diffusion blocks 55 adjacent to each other are separated by the partition wall 52, color mixing in which light of different colors emitted from cells adjacent to each other is mixed is suppressed. Accordingly, the clarity and brightness of the decorative lighting unit 50 are improved, and glare and fatigue of a viewer of the display apparatus 1 are not caused.

Meanwhile, when the backlight light source of the backlight unit 41 includes the plurality of LED packages as described above, the backlight light source may further include a backlight LED board (not shown) on which the plurality of LED packages are mounted. The LED board 63 of the decorative lighting unit 50 and the backlight LED board may be one unseparated member.

The controller (not shown) includes a wired communication unit or wireless communication unit, which receives image data corresponding to an image such as a still image or moving image and transmits electrical signals to the image display unit 30 so that the image is displayed on the front surface of the image display unit 30. Specifically, electrical signals are transmitted to transparent electrodes of the LCD panel 31 and the backlight light source of the backlight unit 41.

The controller may also transmit electrical signals for causing the decorative light source 60 of the decorative lighting unit 50, specifically, the plurality of LED packages 61, to blink. The display apparatus 1 may have a plurality of preset lighting modes. When one lighting mode among the plurality of lighting modes is selected by a user, the controller may transmit electrical signals to the decorative light source 60, specifically, the plurality of LED packages 61, to implement lighting of the selected lighting mode.

Meanwhile, the controller may transmit electrical signals to the decorative light source 60 so that the plurality of LED packages 61 of the decorative light source 60 blink in synchronization with the image displayed on the front surface of the image display unit 30. For example, in the case in which a game starts and the front surface of the image display unit 30 suddenly becomes bright, conversely, in the case in which the game ends and the front surface of the image display unit 30 suddenly becomes dark, or in the case in which the game is won and an image in which congratulatory guns explode appears, all or specific some of the plurality of LED packages 61 may be suddenly turned on or off.

In the display apparatus 1 including the above-described decorative lighting unit 50, the image display unit 30 and the decorative lighting unit 50 are accommodated together in the inner space 17 of the rear case 10. Accordingly, an installation space may be downsized, installation work is easy, and purchase and installation costs are reduced compared to a case in which decorative lighting is installed next to a display apparatus including only an image display unit. Further, since an interval between the image display unit 30 and the decorative lighting unit 50 becomes narrow, a sense of heterogeneity is not felt, and the aesthetics is improved.

In a display apparatus of embodiments of the present invention, an image display unit and a decorative lighting unit are accommodated together in an inner space of a rear case. Accordingly, an installation space can be downsized, installation work is easy, and purchase and installation costs are reduced compared to a case in which decorative lighting is installed next to a display apparatus including only an image display unit. Further, since an interval between the image display unit and the decorative lighting unit becomes narrow, a sense of heterogeneity is not felt, and the aesthetics is improved.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

What is claimed is:

1. A display apparatus comprising:
   a rear case having an inner space;
   an image display unit installed in the inner space of the rear case, and in which an image is displayed on a front surface; and
   a decorative lighting unit including a light diffuser installed around the image display unit in the inner space of the rear case, and formed with a grid pattern, and a decorative light source arranged behind the light diffuser to transmit light through the light diffuser;
   wherein the light diffuser includes an opaque-colored partition wall having a grid-type planar shape to define a plurality of cells arranged to form a matrix, and a plurality of light diffusion blocks formed of a light diffusion material and fitted one by one into the plurality of cells.

2. The display apparatus of claim 1, further comprising an inner case installed in the inner space of the rear case, and configured to support the image display unit so that the image display unit is located at a central portion of the rear case.

3. The display apparatus of claim 1, wherein light incident on a rear surface of one light diffusion block among the plurality of light diffusion blocks is blocked by the partition wall in surface contact with a side surface of the one light diffusion block, and thus is diffused only in the one light diffusion block and emitted to a front surface of the one light diffusion block.

4. The display apparatus of claim 3, wherein the decorative light source includes a plurality of light-emitting diode packages arranged behind the plurality of light diffusion blocks in a one-to-one alignment and an LED board on which the plurality of LED packages are mounted.

5. The display apparatus of claim 4, further comprising a heat resistant double-sided adhesive tape having one side surface adhered to the LED board and the other side surface adhered to a bottom surface of the rear case to fix the LED board to the rear case.

6. The display apparatus of claim 1, wherein the image display unit includes an LCD panel including a pair of substrates spaced apart from each other and a liquid crystal layer interposed between the pair of substrates, and a backlight unit (BLU) configured to project white light onto the LCD panel from behind the LCD panel.

7. The display apparatus of claim 1, wherein the decorative light source blinks in synchronization with the image displayed on a front surface of the image display unit.

* * * * *